US010240285B2

(12) United States Patent
Wilson

(10) Patent No.: US 10,240,285 B2
(45) Date of Patent: Mar. 26, 2019

(54) SYSTEM FOR AND METHOD OF MANUFACTURING HEMP PRODUCTS

(71) Applicant: Gregory A. Wilson, Edgewater, MD (US)

(72) Inventor: Gregory A. Wilson, Edgewater, MD (US)

(73) Assignee: Gregory A. Wilson, Edgewater, MD (US)

( * ) Notice: Subject to any disclaimer, the term of this patent is extended or adjusted under 35 U.S.C. 154(b) by 55 days.

(21) Appl. No.: 15/338,298

(22) Filed: Oct. 28, 2016

(65) Prior Publication Data

US 2018/0119338 A1 May 3, 2018

(51) Int. Cl.

| | |
|---|---|
| ***B32B 5/12*** | (2006.01) |
| ***D06N 7/00*** | (2006.01) |
| ***D04H 3/015*** | (2012.01) |
| ***D04H 3/04*** | (2012.01) |
| ***D04H 3/12*** | (2006.01) |
| ***B27N 3/02*** | (2006.01) |

(52) U.S. Cl.

CPC ............. *D06N 7/0063* (2013.01); *B27N 3/02* (2013.01); *D04H 3/015* (2013.01); *D04H 3/04* (2013.01); *D04H 3/12* (2013.01); *D06N 2201/045* (2013.01); *Y10T 428/249925* (2015.04); *Y10T 428/249942* (2015.04); *Y10T 428/249944* (2015.04)

(58) Field of Classification Search

CPC . Y10T 428/249925; Y10T 428/249942; Y10T 428/249944; Y10T 428/31978; Y10T 428/31982; Y10T 428/31989; D06N 2201/045

See application file for complete search history.

(56) References Cited

U.S. PATENT DOCUMENTS

| | | | |
|---|---|---|---|
| 5,939,209 | A | 8/1999 | Shibuya et al. |
| 6,037,049 | A | 5/2000 | Tingley |

(Continued)

OTHER PUBLICATIONS

International Search Report and Written Opinion for International Appl. No. PCT/US2017/058571 issued by USPTO/ISA dated Jan. 4, 2018.

(Continued)

*Primary Examiner* — Alexander S Thomas
(74) *Attorney, Agent, or Firm* — Steven M. War, Esq.

(57) ABSTRACT

A manufactured hemp product comprising a plurality of adhesively bonded and pressed hemp strands where the majority of the hemp strands are of generally the same length and comprise a naturally-occurring, generally elongate internal structure extending generally along one axis of the strand that has been at least partially laterally broken and at least permeated by an adhesive. The hemp strands are oriented roughly parallel to one another along their length. The manufactured hemp product comprises an amount of adhesive between about 5% to about 49% by weight. The manufactured hemp product can be used as a wood substitute in terms of appearance and performance. The manufactured hemp products may have aesthetic and structural qualities that are suitable for high traffic, high visibility applications such as boards, blocks, beams, panels, flooring, furniture, building materials and other wood products.

11 Claims, 12 Drawing Sheets

(56) References Cited

U.S. PATENT DOCUMENTS

| | | | | |
|---|---|---|---|---|
| 6,197,414 | B1 * | 3/2001 | Kawai | B27N 3/04 428/292.4 |
| 6,641,909 | B1 | 11/2003 | Wasylciw | |
| 2006/0032167 | A1 | 2/2006 | Cecilio et al. | |
| 2008/0000548 | A1 | 1/2008 | Liu et al. | |
| 2009/0324874 | A1 | 12/2009 | Meijers et al. | |
| 2011/0293880 | A1 | 12/2011 | Yu et al. | |
| 2013/0202905 | A1 * | 8/2013 | Blount | C08H 8/00 428/533 |
| 2016/0130762 | A1 | 5/2016 | Ramaratnam et al. | |
| 2016/0257815 | A1 * | 9/2016 | Varnell | C08L 97/02 |

OTHER PUBLICATIONS

Morlan "Wood Janka Hardness Scale/Chart by Common/Trade Name. 771 Woods Listed Alphabetically A-E by Cornmon/Trade Name" Archive version: Apr. 26, 2012 (Apr. 26, 2012) (https://web.archive.org/web/20120426064548/http://www.morlanwoodgifts.com/MM011.ASP?pageno=207).

Kronbergs et al. "Mechanical Properties of Hemp (*Cannabis saliva*) Biomass" Proceedings of the 8th International Scientific and Practical Conference. vol. 1.2001 (ISBN 978-9984-44-070-5).

* cited by examiner

SYSTEM FOR AND METHOD OF MANUFACTURING HEMP PRODUCTS

TECHNICAL FIELD

Disclosed herein are manufactured hemp products and methods of making the same. More particularly, the manufactured hemp products described herein may include hemp composite boards, blocks, beams, panels, flooring, furniture, building materials and other wood products wherein the grain of the product is displayed, as in some composite or wood products.

BACKGROUND

Today's increased demand for wood products, coupled with unbridled deforestation, has led to a scarce supply of timber sources. Many species of majestic rainforest trees are endangered or are approaching extinction. In addition to a reduced supply of trees, many trees traditionally coveted for their wood take many years to reach maturity. Thus, even if these trees are replanted, it will take many years to replenish the supply. This scarcity of natural wood may be particularly noticeable in those industries that rely on the particular aesthetic and structural qualities of the natural wood, such as the wood flooring, furniture, building materials or other wood industries.

Substitutes for natural wood can include, for example, plywood, particle board, and the like. However, many of these substitutes are derived from natural wood but do not have visual or technical attributes of natural wood. Furthermore, they may not address the issue of finding and maintaining a sustainable raw material supply for the future.

One of ordinary skill in the art would understand that a hemp stalk consists of an outer layer (typically called the Epidermis), a first inner layer (typically called the Bast Fiber), a second inner layer (typically called the Hurd or Core), and a hollow inner core.

SUMMARY

A method and system have been developed that allows for the use of hemp stalks from *Cannabis Sativa, Cannbis Indica* or *Cannabis Ruderalis* plants (as well as plants with similar properties) which can be grown as replenishable plants indoors (or agricultural crops outdoors) to replace hardwood used in flooring, furniture and other wooden products. These products derived from hemp stalks provide the same or better hardness, stability, and density.

One embodiment of the method of preparing hemp stalks for use in a manufactured hemp product may include beginning with a hemp stalk piece from a *cannabis* plant. The hemp stalk piece is generally rectangular or cylinder and it may have a thickness in the range of about 0.1 mm to about 75 mm. The hemp stalk piece typically includes an internal surface area which is accessible from the outside of the hemp stalk piece. The hemp stalk piece generally has a naturally-occurring, generally elongate internal structure extending along one axis of the hemp stalk piece.

In harvesting, the hemp stalk is cut above the roots and the branches are (typically) removed. This provides an elongate hemp stalk piece from the *cannabis* plant. The internal volume of the hemp strand is capable of absorbing fluid accessible from the outside of the hemp stalk piece. Additionally, breaking at least a portion of the naturally-occurring generally elongate internal structure parallel to the axis increases the surface area of the hemp stalk piece such that the ability of the hemp piece to absorb an adhesive solution increases by at least 10% than the surface area of the hemp stalk piece prior to breaking at least a portion of the internal structure.

In some embodiments the hemp stalk piece is cut to size after which the hemp stalk piece may be deskinned, split and crushed to further open the internal lignocellulosic plant structure. This optional step is typically based on visual observation and the adhesive application. In addition, boiling the hemp stalk pieces in H2O or in a mild H2O2 solution or carbonizing with pressured steam may occur. The hemp strands are dried then submersed in a fossil fuel or agricultural based adhesive solution for about 0.5-20 minutes. Subsequent to this submersion, the hemp strands are air or heat dried to a second total water content of between about 5% to about 20% by weight for thermal set adhesives. If a cold set adhesive is going to be used, the hemp strands are not typically dried. The hemp strand includes adhesive in the range of between about 5% to about 49% by weight. Typically, the adhesive-applied strands for thermoset adhesives are dried, but adhesive-applied strands are not dried for cold set adhesives.

Subsequent steps normally include placing the adhesive-applied strands into a mold with a lid; and applying pressure to the hemp strands. When thermoset adhesives are used, heat is typically applied to the mold while pressure is applied. Alternately, a lid can be used to maintain pressure on the strands during adhesive curing. For cold set adhesives while no heat is required, pressure is applied or, alternatively, a lid can be used to maintain pressure during adhesive curing.

Once the applied adhesives are cured, the pressure is released (or the mold lids are opened) and the manufactured hemp product is removed. The short ends of the manufactured product are trimmed/cut to form a uniform edge. The manufactured hemp product is then allowed to stabilize in ambient air conditions. The manufactured hemp product is then in the form of board, block beam or panel and is allowed to stabilize in ambient atmosphere conditions. Afterward, the manufactured hemp product is then dried with air or heat to obtain the required moisture content.

The manufactured hemp product is comprised of a plurality of hemp stalk strands from a *cannabis* (or similar) plant less than one year old and typically has a density in the range of about 200 kg/cm$^3$ to about 900 kg/cm$^3$ with the desired amount of adhesive. The density and hardness of the final product is a result of: (1) the extent to which the lignocellulosic structure is opened, (2) the density of the adhesive solution, (3) the amount of time that the hemp stalk strands are submersed, and (4) the pressure applied to the mold.

The manufactured hemp product comprises an amount of hemp strands greater than 50% and an amount of adhesive in the range of 5% to about 49%. The manufactured hemp product has a generally uniform density in the range of between about 600 kg/m3 to about 1200 kg/m3; and the manufactured hemp product has an aesthetically pleasing appearance. The manufactured hemp product has a dimensional stability coefficient of change that is at least 10% more stable than the original hemp stalk according to the dimensional stability coefficient of change. Test results have shown the manufactured hemp product to have an improved hardness over natural hemp stalks according to the Janka Hardness Test.

BRIEF DESCRIPTION OF THE DRAWINGS

The drawings are meant to illustrate the principles of the invention and do not limited the scope of the invention. The above-mentioned features and objects of the present disclosure will become more apparent with reference to the following description taken in conjunction with the accompanying drawings wherein like reference numerals denote like elements in which.

DETAILED DESCRIPTION

Figure 1:
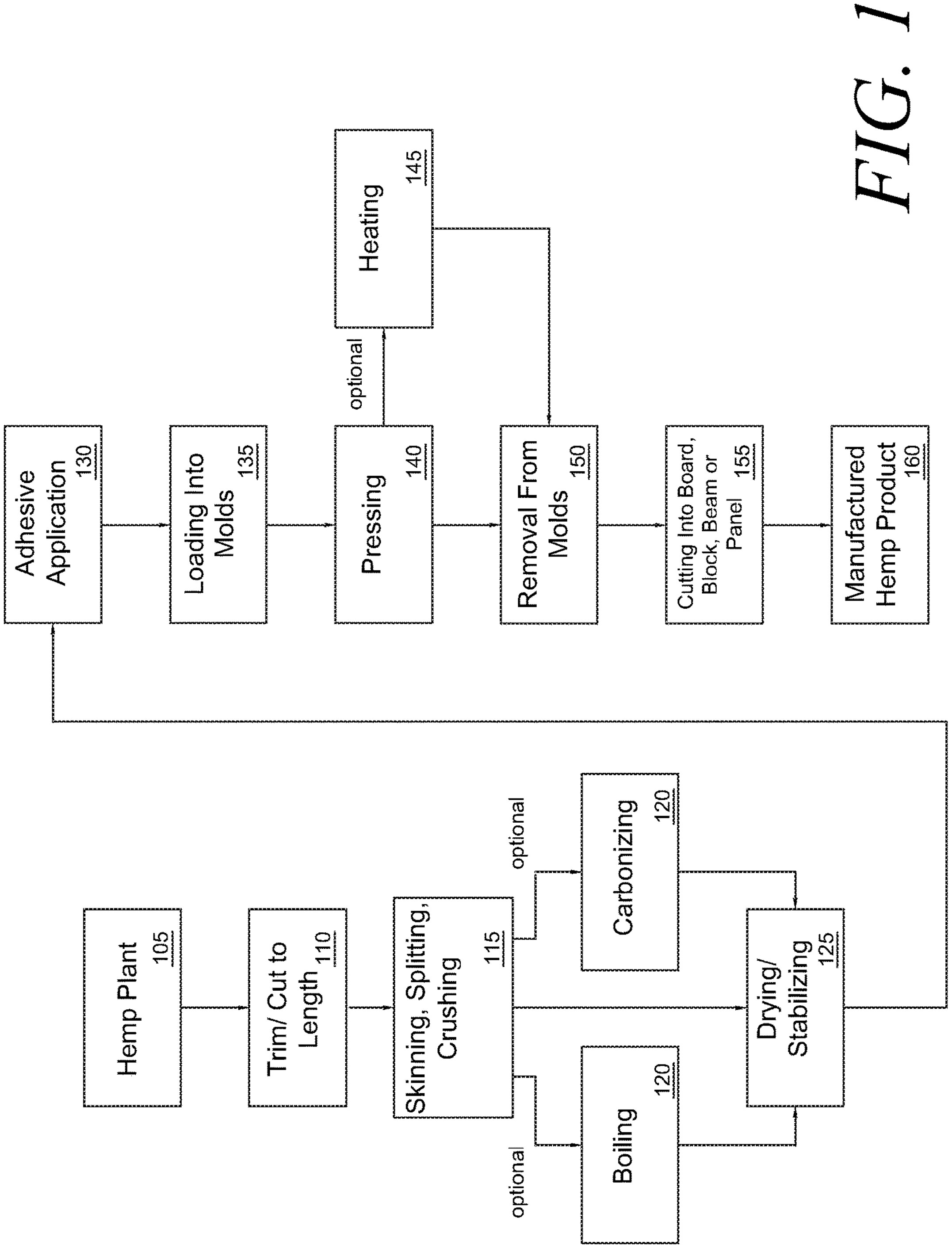
FIG. 1 is a process flow chart illustrating one embodiment of a system described herein.

FIG. 1 illustrates a process flow chart of one embodiment of the present invention. The flow chart begins with a hemp plant in Step 105. In Step 110 the hemp stalk is trimmed/cut to length. In Step 115, the cut lengths of the hemp stalk piece (stalks and petiole) are skinned, split and/or crushed; creating hemp strands. Each of these steps (i.e., the skinned, split and/or crushed steps) is optional. In Step 120 the hemp strands may be boiled or carbonized. In step 125 the boiled/carbonized/natural hemp strands are dried/stabilized (acclimatized). In Step 130 the first dried hemp strands have resin/glue/adhesive (generally referred to as adhesive) applied. In Step 135 the hemp strands with the adhesive applied are loaded into molds. In Step 140 pressure is applied to the unpressed hemp strands. Pressure can be applied through direct pressure or through the use of a lid. In Step 145 heat is optionally applied to the pressed hemp strands. After Step 140 or Step 145, the adhesive has cured and the heated hemp strands and adhesive have bonded together creating a monolithic molded hemp piece. The monolithic hemp piece is then removed from the mold in Step 150. In Step 155, after the monolithic unmolded hemp piece is allowed to stabilize/rest, it is then cut into boards, blocks, beams or panels. In step 160 the manufactured hemp product is ready for use for its intended purpose.

Figure 2A:
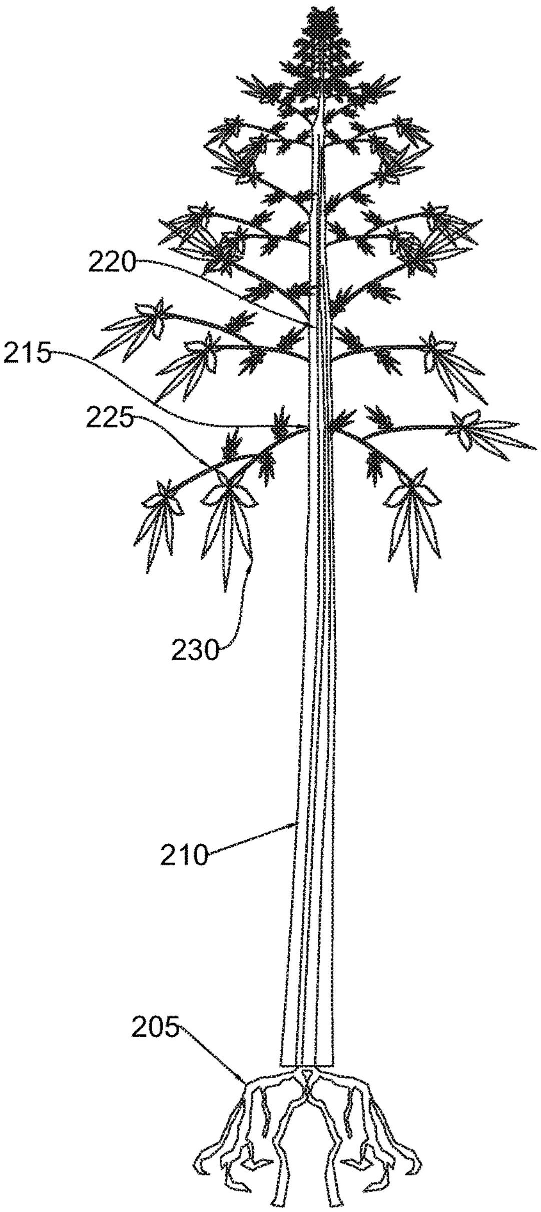
FIG. 2A is a drawing of an outdoor hemp plant.
Figure 2B:
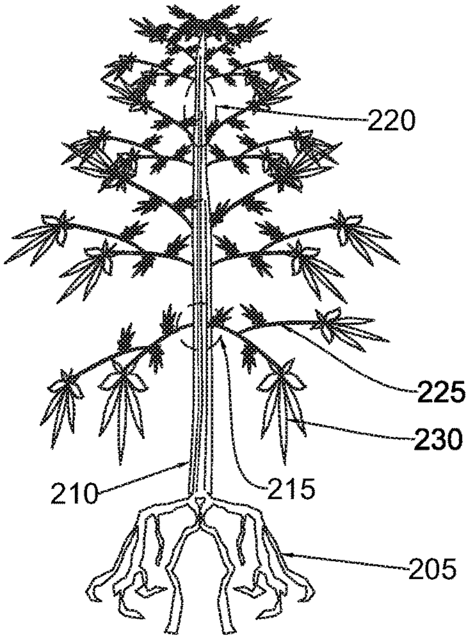
FIG. 2B is a drawing of an indoor hemp plant.

FIG. 2 is a drawing of hemp plants. The manufactured hemp product uses the hemp stalks from *Cannabis Sativa, Cannbis Indica* or *Cannabis Ruderalis* plants (as well as plants with similar properties), which can be grown as replenishable hemp plants indoors (FIG. 2B) or agricultural hemp plants outdoors (FIG. 2A). The agricultural hemp plants shown in FIG. 2A can grow up to 2.5 meters in one growing season, which is generally less than one year. Agricultural hemp plants (grown outdoors) (FIG. 2A) have been tested to have fiber content of 50-60% with generally elongated stalks. Indoor grown hemp plants (FIG. 2B) are usually smaller in height and thinner in stem diameter with a fiber content lower than naturally grown outdoor hemp plants (FIG. 2A). Each type of hemp plant includes Roots 205, Main Stalk 210, Nodes 215, Internodes 220, Petoile 225, and Fan Leaf 230. Preferably, the manufactured hemp products of the present invention use the Main Stalks 210, but may also incorporate the Nodes 215, Internodes 220 and Petoile 225. Hemp stalk are known to have higher fiber content than many trees species; with research showing standard tree species <50% fiber content with hemp having up to 57% fiber content.

Figure 3:
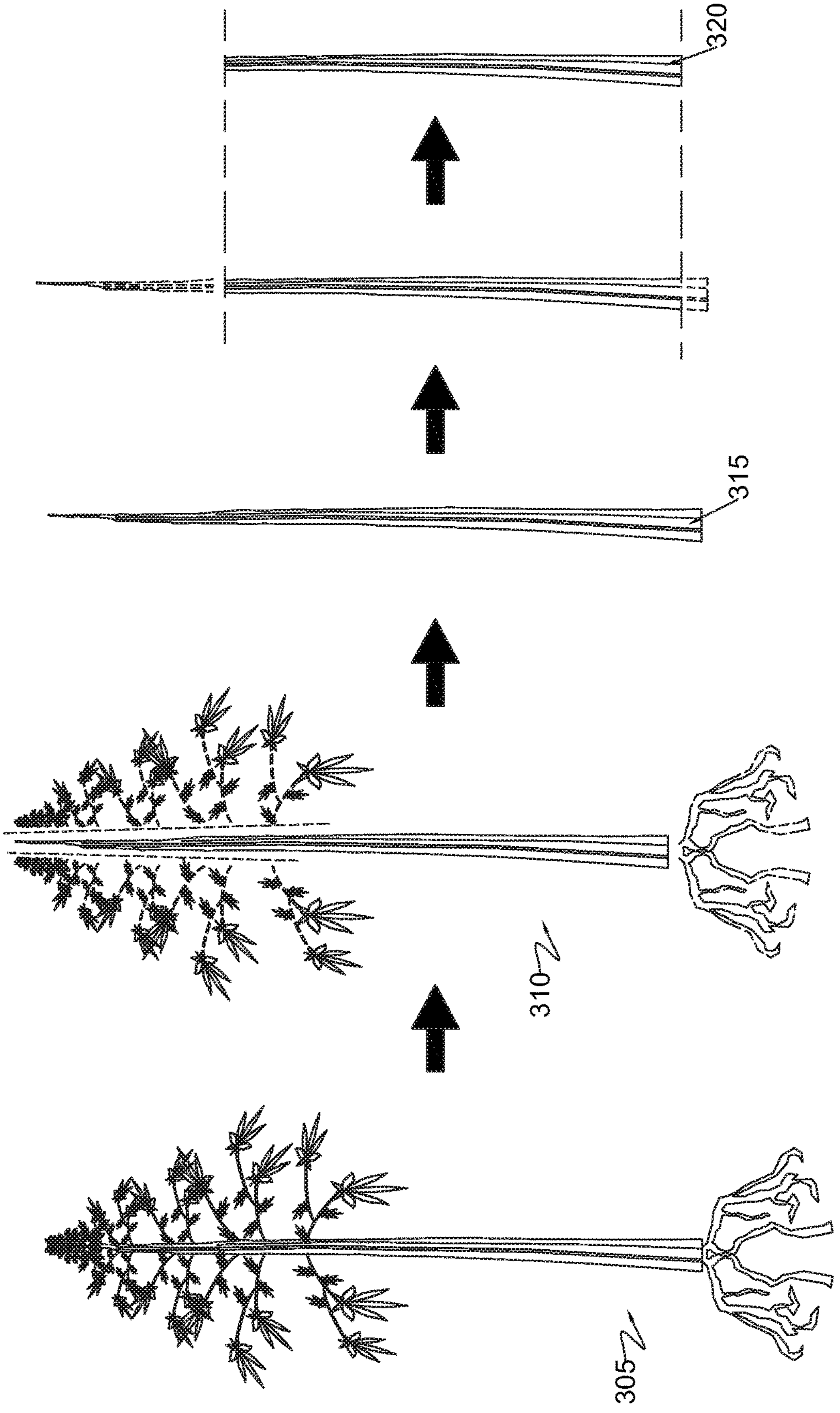
FIG. 3 is a drawing of a hemp stalk being cut/trimmed to length.

FIG. 3 is a drawing of the hemp stalk being cut/trimmed to length. Some embodiments disclosed herein are directed to a method of preparing hemp stalks for use in a manufactured hemp product. This embodiment includes providing a hemp stalk piece from a *cannabis* plant 305, wherein the hemp stalk piece is generally rectangular or cylinder and has a thickness <75 mm. The internal surface area of the hemp stalk piece is accessible from the outside of the hemp stalk piece, with the hemp stalk piece having a naturally-occurring, generally elongate internal structure extending along one axis of the hemp stalk piece. Cutting the hemp stalk above the roots and removing the Petiole at the Nodes 310, provides an elongate hemp stalk 315 from a, for example, *cannabis* plant, where the hemp stalk has a length and a width, generally rectangular or cylinder in cross section 320, and has a thickness in the range of between about 0.1 mm to about 75 mm. Additionally, the internal volume of the hemp stalk is capable of absorbing fluid accessible from the outside of the hemp piece because the hemp stalk piece has a naturally-occurring, generally elongate internal structure extending generally along the length of the hemp stalk piece.

Figure 4:
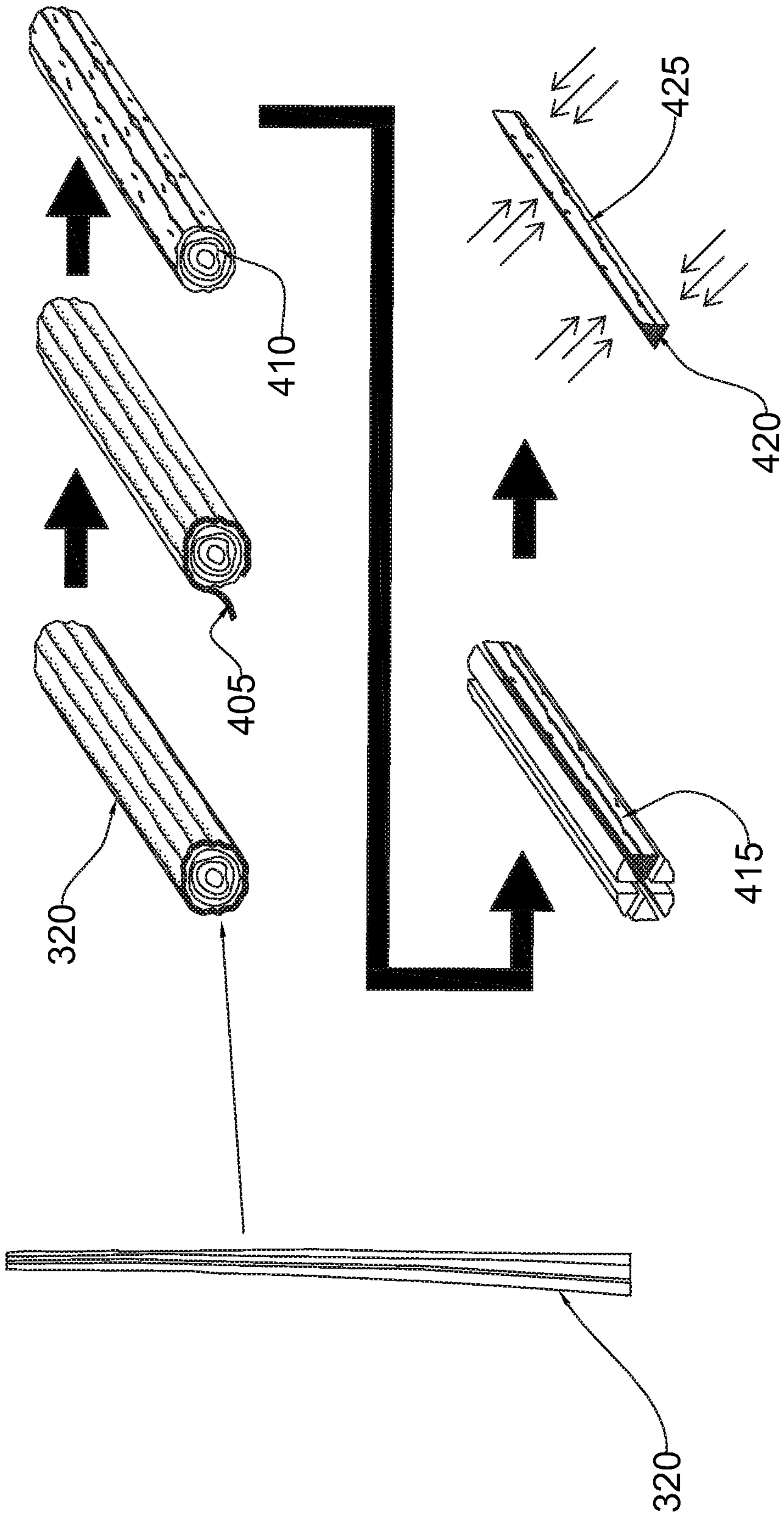
FIG. 4 is a drawing of a hemp stalk piece being skinned, split and crushed to create a hemp strand (degree of split, skin and crushed varies or may be omitted).

FIG. 4 is a drawing of a hemp stalk piece 320 being skinned 405, split 415, and crushed 420 to create a hemp stalk strand. A skinned hemp stalk piece is shown by reference number 410. One of ordinary skill in the art would appreciate that the degree of the hemp stalk piece being skinned, split, and/or crushed varies or these processes may be omitted entirely. Some embodiments disclosed herein are directed to a method of preparing hemp stalk for use in a manufactured hemp product that includes a hemp stalk piece from a *cannabis* plant 310. Splitting 415 at least a portion of the naturally-occurring generally elongate internal structure of the hemp stalk parallel to the axis of the hemp stalk 320 increases by at least 10% than the surface area of the hemp stalk piece prior to breaking at least a portion of the internal structure. The breaking step increases the surface area of the hemp stalk piece thereby increasing the ability of the hemp stalk piece to absorb an additional amount of the adhesive solution. In some embodiments after the hemp stalk piece is cut to size, the skin is removed 405 leaving a hemp stalk piece which is unskinned 410, it is split into strands 415, and/or crushed 425 to further open the internal lignocellulosic plant structure. The optional step of splitting the strand is similar to splitting a log. The optional step of crushing is generally performed through a rolling action. The crushing process results in crushed hemp stalk 420. The amount of splitting, skinning and crushing the hemp stalk piece to create a hemp strand varies in accordance with the required strength and visual appearance of the finished product. Reducing or eliminating the skinning, splitting and crushing allows less adhesive to penetrate the hemp strand and provides a “more busy” (or more complexed) visual appearance of the final product.

Figure 5:
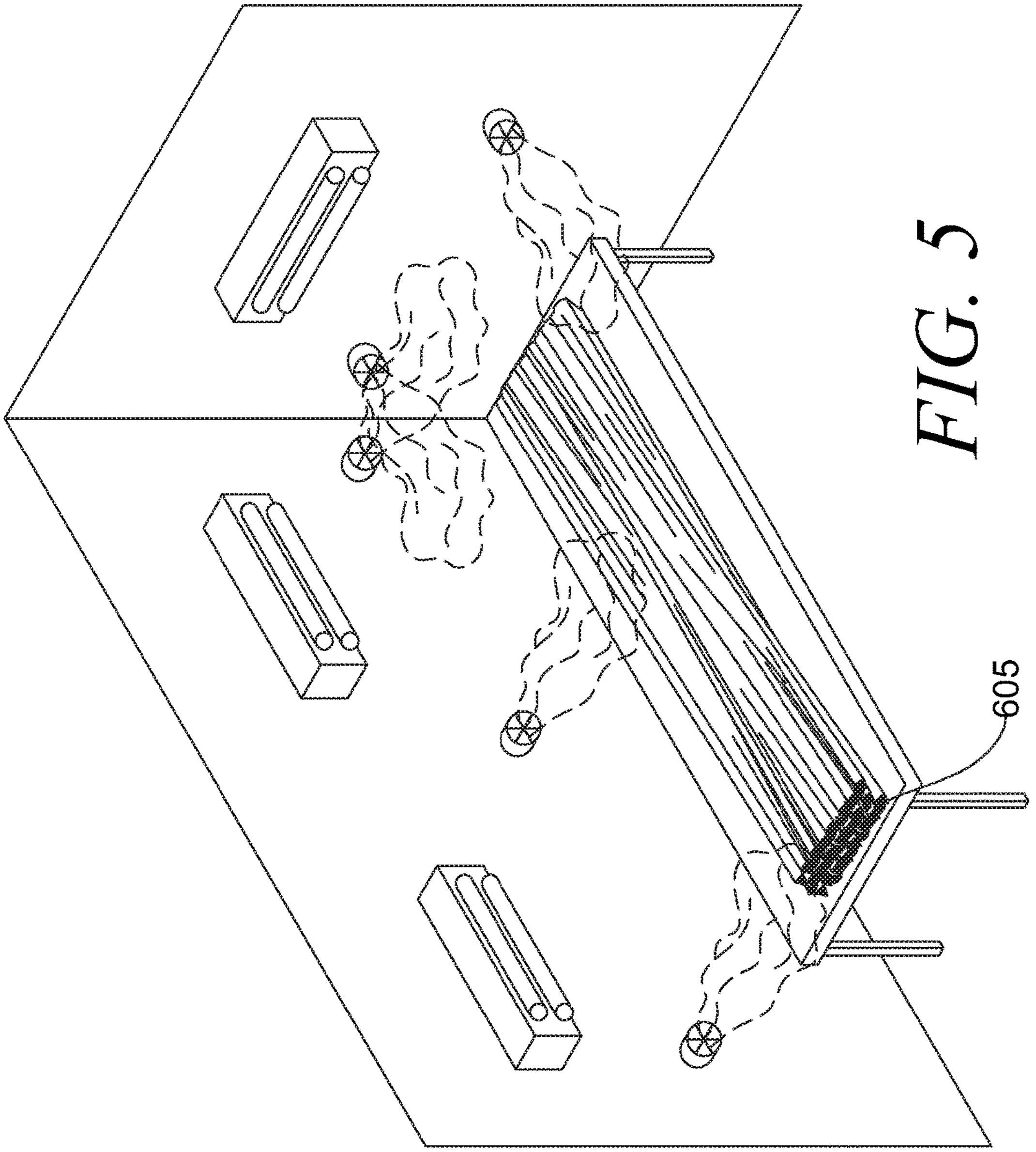
FIG. 5 is a drawing of a hemp strand being boiled or carbonized (optional).

FIG. 5 is a drawing of a hemp strand being boiled or carbonized. These steps of boiling or carbonizing the hemp strands are optional. Some embodiments disclosed herein are directed to a method of preparing hemp stalk for use in a manufactured hemp product that can include providing a hemp strand. The optional steps of boiling the hemp strand in H2O or a mild H2O2 (2%) solution will remove natural sugars in the strand creating better adhesive penetration/bonding and a more uniform color to the end product. Boiling is generally conducted at above 100 C for a minimum of 2 hours. Carbonizing the hemp strand with pressured hot steam above 120 C will darken the color of the end manufactured hemp product by carbonizing the sugars for 2-4 hours to reach required color darkness.

Figure 6A:
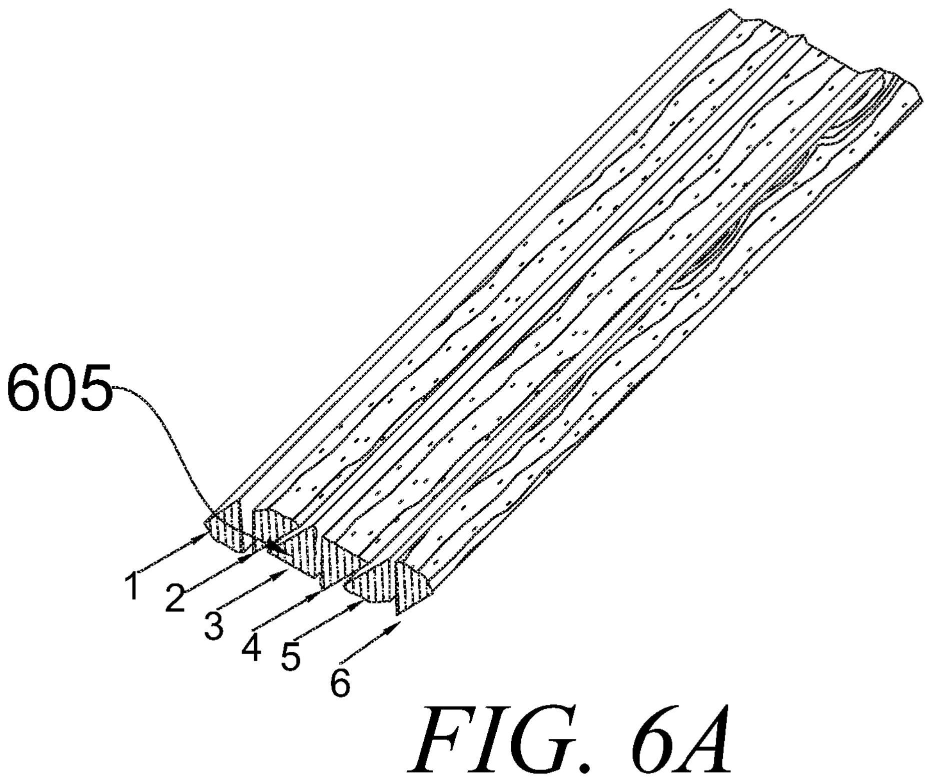
FIG. 6A is a drawing of a first dried hemp strand.
Figure 6B:
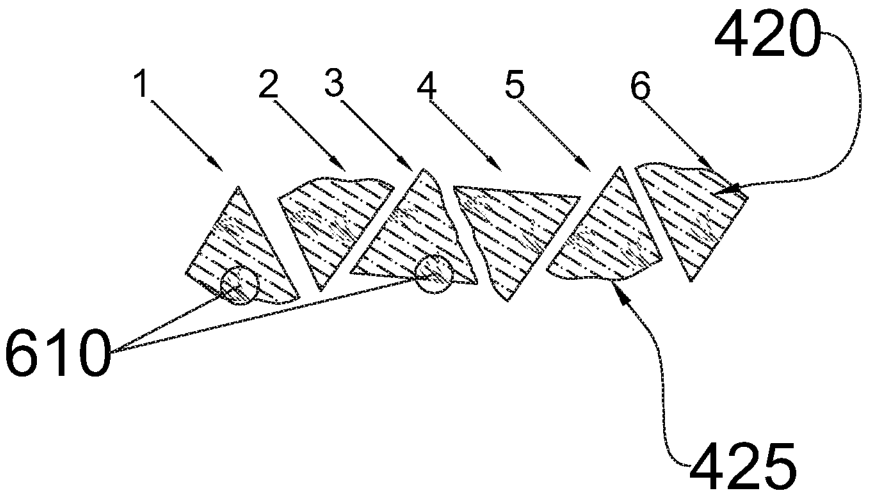
FIG. 6B is a magnified view of the dried hemp strand of FIG. 6A.

FIG. 6 is a drawing of a hemp strand (after the optional boiling or carbonizing) (FIG. 6A) after the drying process which shows individual strands of similar size 605. A magnified drawing (FIG. 6B) indicates stress fractures from the optional crushing process 420. At this point, the hemp stalk strand is dried to a first total water content preferably of less than 20% by weight. Drying the hemp stalk strand can be done by using forced air, heat, sunshine or ambient air conditions. Best practice is using natural elements such as sunshine, but wood drying room, kiln or microwave technology are also acceptable. Boiling the hemp strands is optional after de-skinning/splitting/crushing creates more uniform colors removing some of the green color of the live plant. Adding H2O2 to the water solution for boiling improves the chemical bonding for phenol formaldehyde adhesives. Carbonizing the hemp strands is optional after cutting splitting/de-skinning. It is the process of pressure steaming the hemp strands to create a darker brown color by carbonizing the sugars in the stalk.

Figure 7:
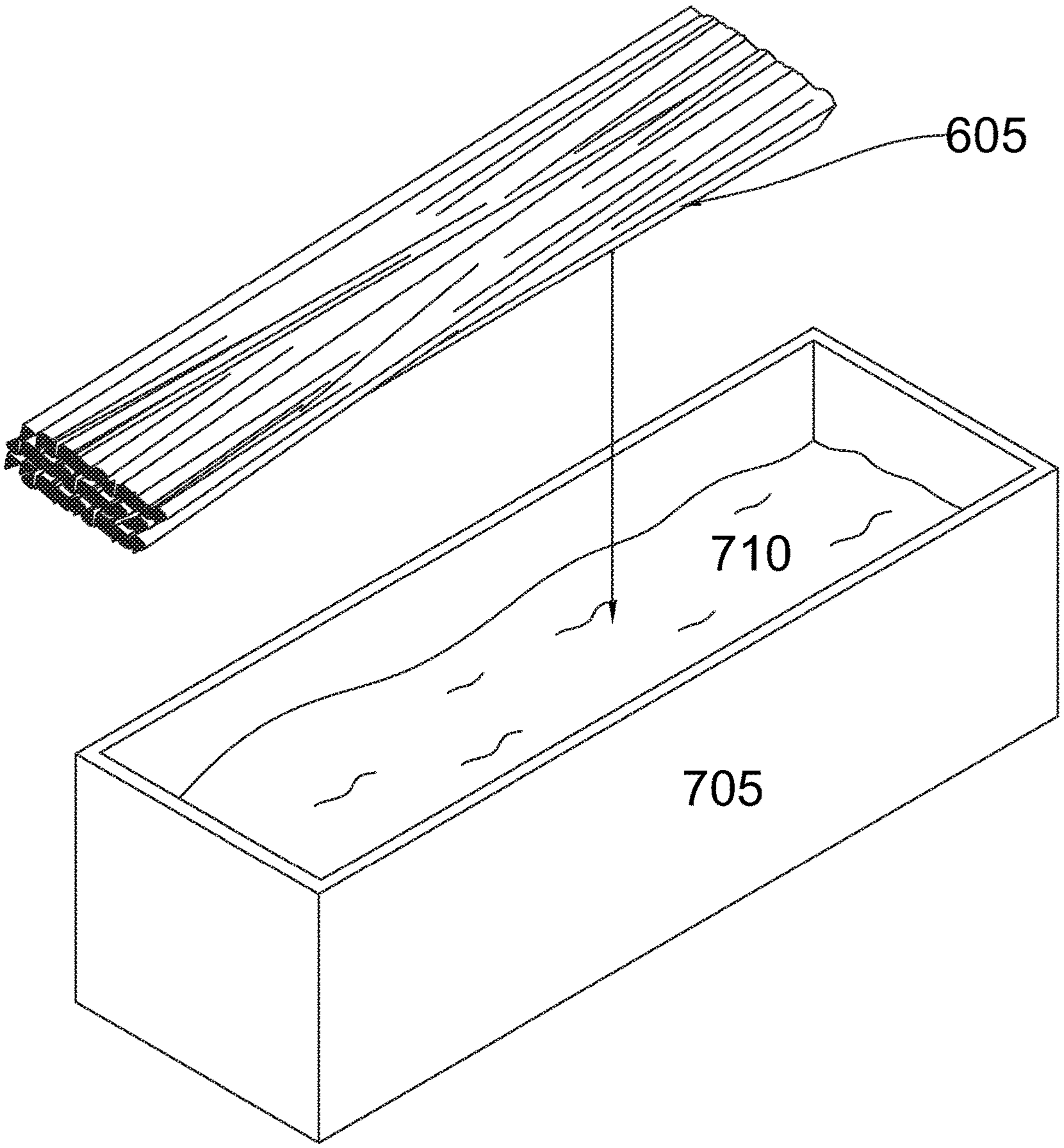
FIG. 7 is a drawing of the adhesive application to hemp strands.

FIG. 7 is a drawing of the adhesive application to the first dried hemp strands. Some embodiments disclosed herein are directed to a method of preparing hemp stalk for use in a manufactured hemp product that can include providing a hemp strand 605. The hemp strands are submersed in a container 705 full of fossil fuel or agricultural based adhesive solution 710 for between about 0.5-20 minutes. Agricultural based adhesives may include but are not limited to; soy, hemp, wheat or flowers. Petro based adhesives may include but are not limited to; urea formaldehyde, phenol formaldehyde, melamine urea formaldehyde, polyvinyl acetate, polyurethane, emulsion polymeric isocyanates or melamin formaldehyde. Afterward, the hemp strands with applied adhesive is air or heat dried to a second total water content of between about 5% to about 20% by weight for thermal set adhesives. Alternatively, the drying step is eliminated for cold set adhesives. The hemp strand includes adhesive in the range of between about 5% to about 49% by weight.

Agri based adhesives are derived from natural occurring organic compounds, and are more eco-friendly and the preferred choice by end users for the manufactured hemp product. Cost, technical properties and ease of use sometimes limit the use of these eco-friendly adhesives. Fossil fuel based adhesives are derived from petroleum or other fossil fuels and include curing or linking agents such as isocyanates, phenol, urea, melamine or acetates. These products are not eco-friendly but typically create a stronger and more cost efficient product.

Cold Set Adhesives—can cure at room temperature (5-40 C) and do not require an applied heat source, curing time is generally longer than thermoset adhesives. These adhesives generally have a higher viscosity and are applied more to the surface of the hemp strands, penetrating the hemp strand cell structure to a lesser degree than the diluted thermoset adhesives. Thermoset Adhesives—cure at higher temperatures (examples UF 70 C and PF 120 C) and require an applied heat source, curing time is generally shorter than cold set adhesives. Thermoset adhesives can be applied via a H2O dilution technique which includes using a 50% diluted adhesive to lower the viscosity in turn increasing the penetration of the plant structure. Following the flooding of the cell structure of the hemp strands the H2O is dried out of the hemp stalk but the adhesive remains clinging to the internal cell structure of the plant. These dried strands will require a heat curing system to trigger chemical bonding in some cases.

Figure 8:
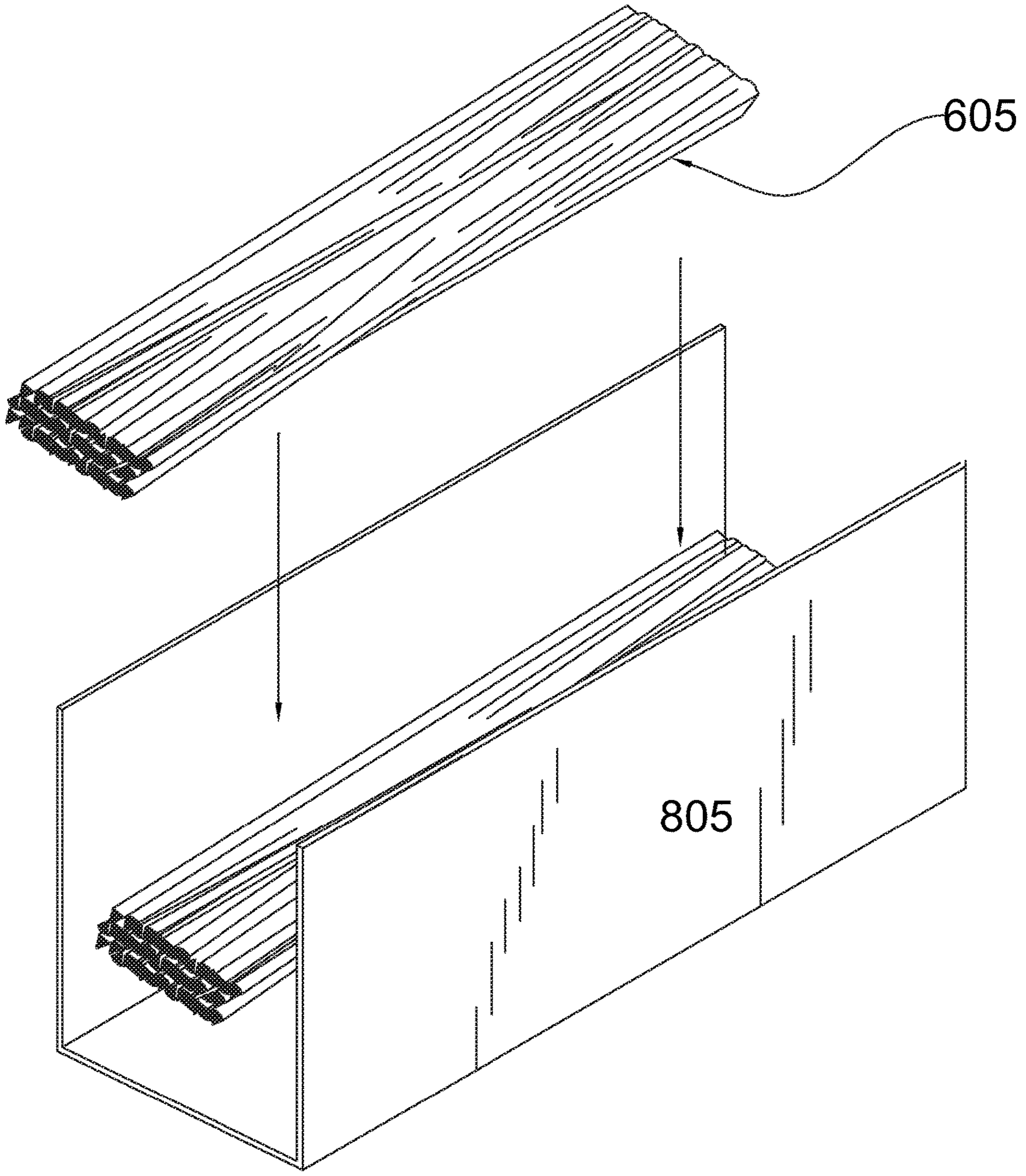
FIG. 8 is a drawing of the adhesive applied hemp strands being loaded into molds.

FIG. 8 is a drawing of the adhesive applied hemp strands 605 being loaded into molds 805. Some embodiments disclosed herein are directed to a method of making a manufactured hemp product that can include providing a plurality of hemp strands, and placing the adhesive-applied strands into a mold, where the mold has an interior width greater than the width of an individual adhesive applied hemp strand.

Figure 9:
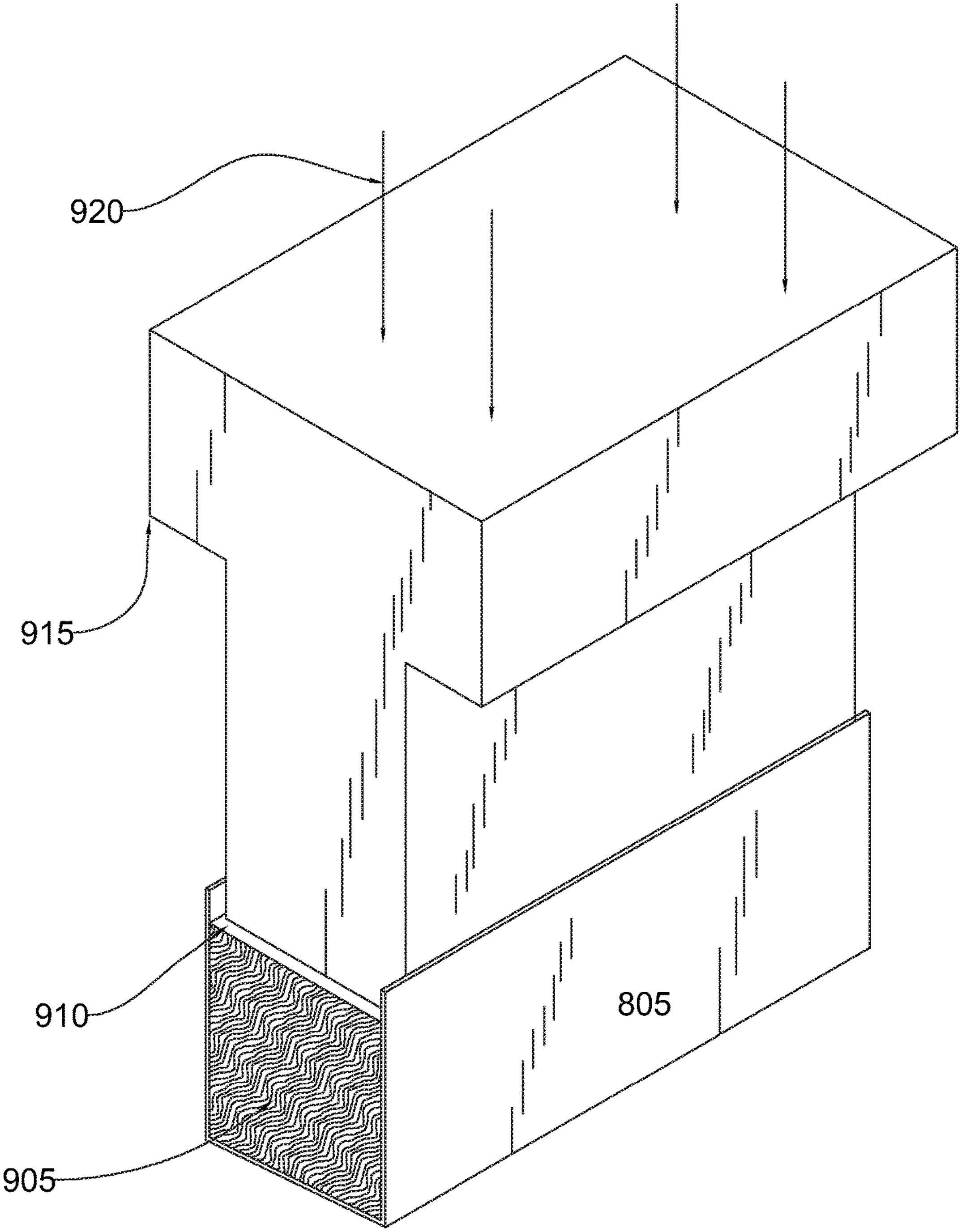
FIG. 9 is a drawing of the molds with adhesive applied hemp strands being pressed.

FIG. 9 is a drawing of the molded hemp strands being pressed. Some embodiments disclosed herein are directed to a method of making a manufactured hemp product that can include providing a plurality of adhesive applied hemp strands 905 placed into a mold 805 with a lid 910, using a press 915 and applying pressure 920 to the molded hemp strands in the mold to thereby form a manufactured hemp product. The amount of pressure 920 applied depends on the required density and hardness of the finished product. For thermoset adhesives heat is applied to the mold with pressure still applied or a lid attached to maintain pressure during adhesive curing. For cold set adhesives no heat is required, but pressure remains applied or a lid attached to maintain pressure during adhesive curing.

Figure 10:
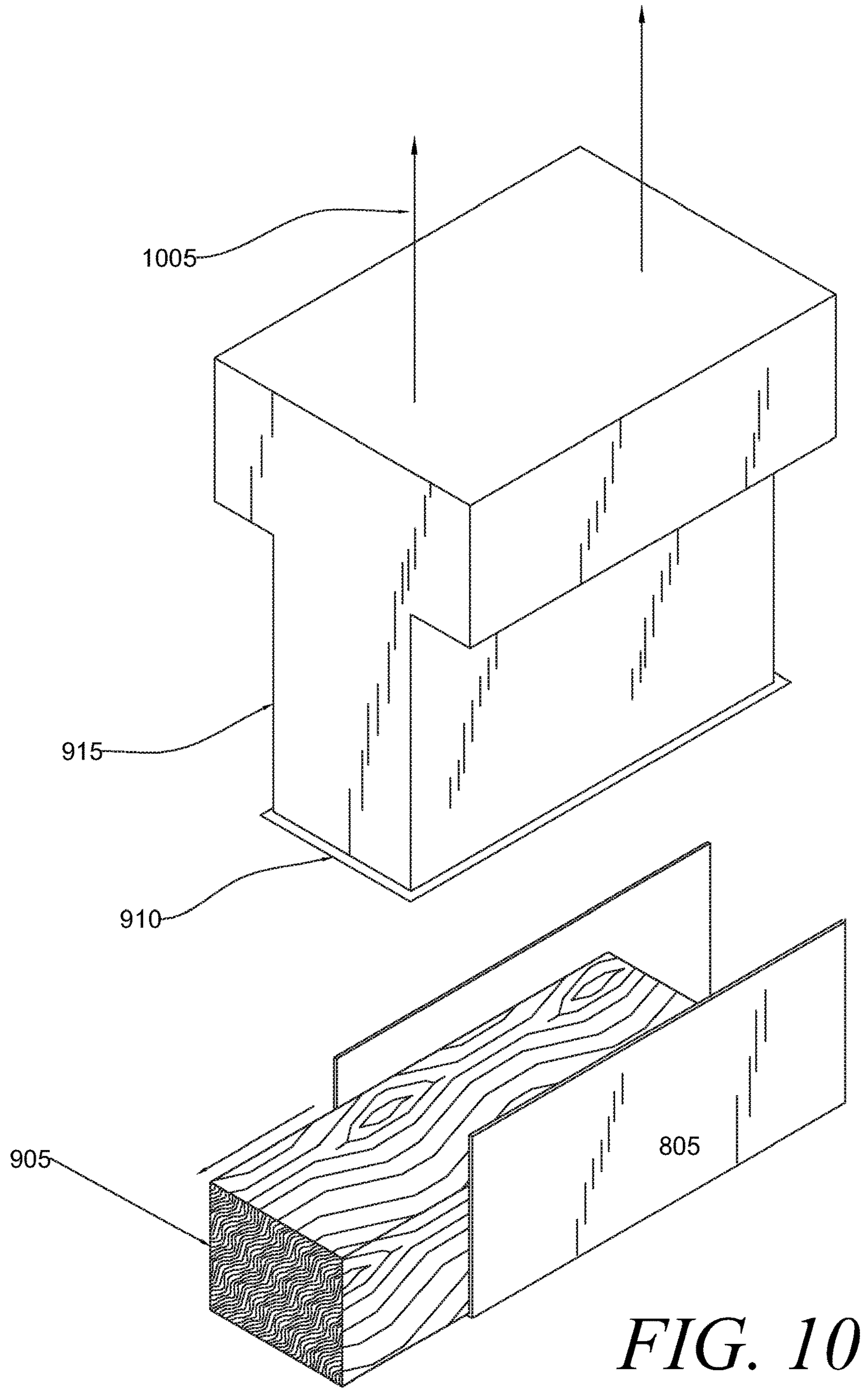
FIG. 10 is a drawing of the molds being opened and monolithic hemp piece trimmed.

FIG. 10 is a drawing of the molds 805 being opened and the pressed hemp strands being trimmed. Some embodiments disclosed herein are directed to a method of making a manufactured hemp product including hemp strands and a desired amount of adhesive. Once the adhesives are cured, the pressure is released 1005 or the mold lids 910 are opened and the manufactured hemp product is removed 905. The short ends of the manufactured product are trimmed/cut to form a uniform edge. The manufactured hemp product is then allowed to stabilize in ambient air conditions.

Figure 11B:
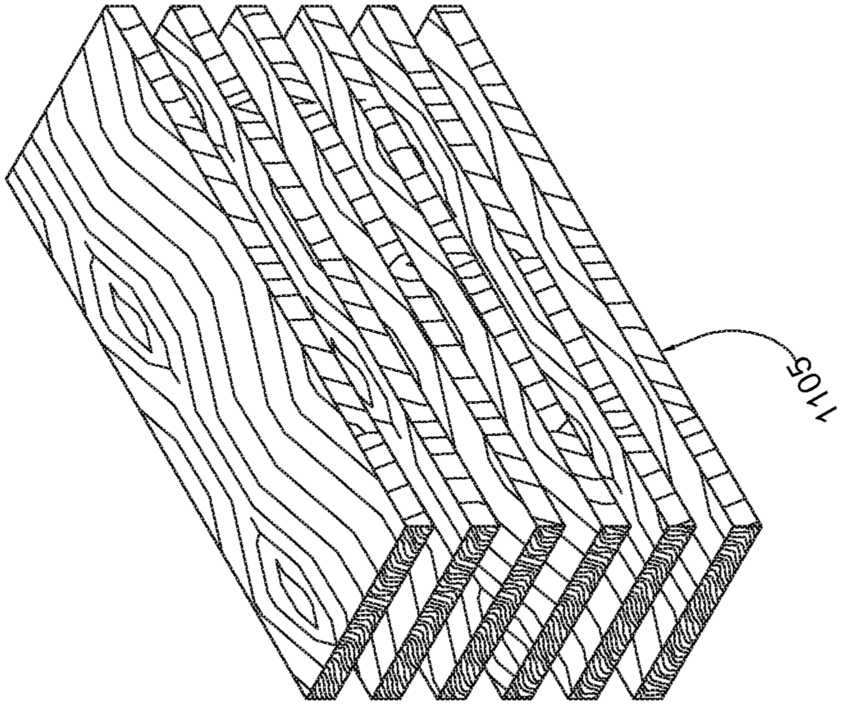
FIG. 11B is a drawing of the molded hemp strand of FIG. 11A being cut into board, block, beam or panel.
Figure 11A:
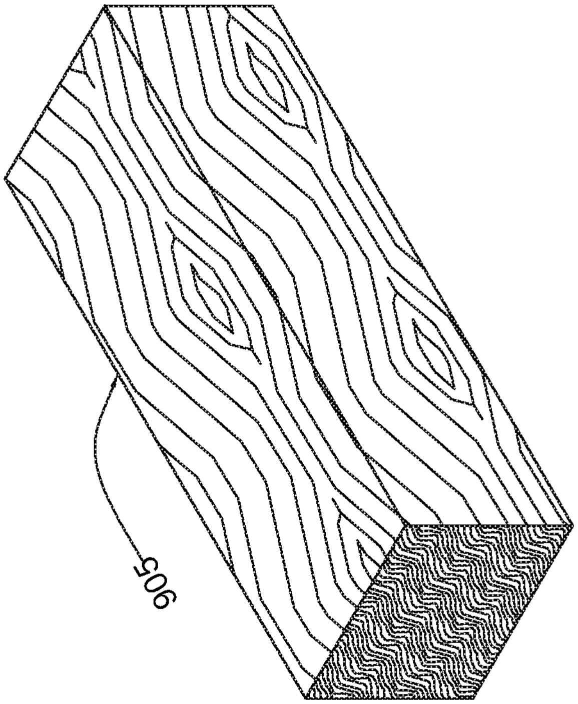
FIG. 11A is a drawing of the molded hemp strand.

FIG. 11 is a drawing of the monolithic hemp piece 905 being cut into board, block, beam or panel 1105. The manufactured hemp product many then be cut, sanded or formed into board, block, beam or panel. Once in board, block, beam or panel shape the product is allowed to stabilize for preferably 2-10 days pending environmental conditions.

Figure 12:
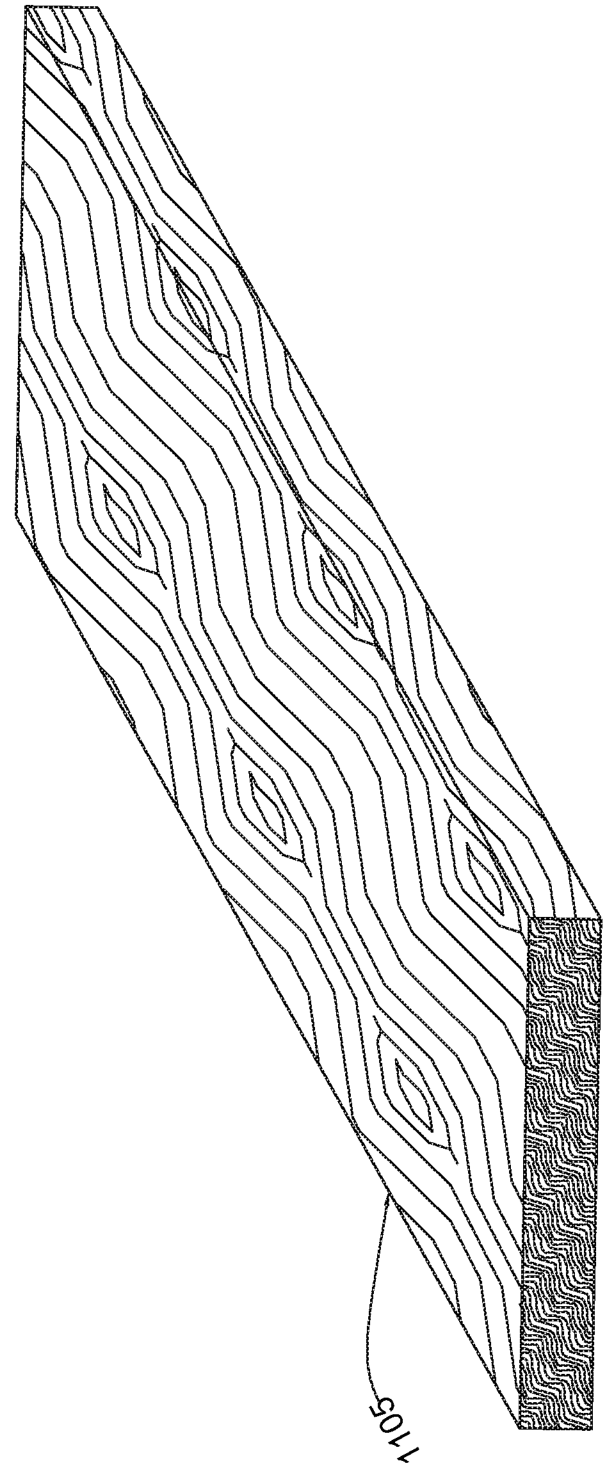
FIG. 12 is a drawing of a manufactured hemp product.

FIG. 12 is a drawing of a manufactured hemp product 1105. Some embodiments disclosed herein are directed to a manufactured hemp product that can include a plurality of adhesively bonded and pressed hemp strands; where: (1) each of the hemp strands is of generally the same length; (2) each hemp strand comprises a naturally-occurring, generally elongate internal structure extending generally along one axis of the strand that has been at least partially laterally broken and at least partially permeated by an adhesive; (3) the hemp strands are oriented roughly parallel to one another along their length; (4) the manufactured hemp product comprises an amount of adhesive in the range of between about 5% to about 49% by weight; and (5) the manufactured hemp product has a generally uniform density in the range of between about 600 kg/m3 to about 1200 kg/m3. The manufactured hemp product has a dimensional stability coefficient of change that is at least 10% more stable than the original hemp stalk according to the dimensional stability coefficient of change. The manufactured hemp product has a hardness pending adhesive used and density. Test results have shown the manufactured hemp product to have an improved hardness over natural hemp stalks according to the Janka Hardness Test.

Test Results

| Test | | Results: Natural Hemp Stalk* | | Results: Manufactured Hemp Product* |
|---|---|---|---|---|
| Density (kg/m3) | Internodes/Petiole | 476 | | 748 |
| | Main Stalk | 616 | | 813 |
| Dimensional Change Coefficient | Internodes/Petiole | 0.00190 | | 0.00140 |
| | Main Stalk | 0.00179 | | 0.00134 |
| Janka Hardness | Internodes/Petiole | 3.9 | PVA | 6.4 |
| | Main Stalk | 5.5 | PF | 9.3 |

*Source 24 week old hemp plant

Some embodiments herein are directed to a manufactured hemp product that can include a plurality of adhesively bonded partially broken hemp strands; wherein each of the partially broken hemp strands maintains its original structure from an appearance point of view; the majority of the partially broken hemp strands from the stalk are the same length, but pieces from nodes, internodes and petiole may be of varying size; each partially broken hemp strand comprises a naturally-occurring, generally elongate internal structure extending along the length of the strand that has been at least partially broken and at least partially permeated by the adhesive; the partially broken hemp strands are oriented approximately parallel to one another along their length.

The invention claimed is:

1. A manufactured hemp block comprising:

a plurality of adhesively bonded partially broken hemp strands, said hemp strands including both bast fiber and hurd, wherein:

each of said partially broken hemp strands maintains its original structure from an appearance point of view;

each partially broken hemp strand comprises a naturally-occurring, generally elongate internal structure extending along the length of the strip that has been at least partially broken and at least partially permeated by an adhesive;

said partially broken hemp strands are oriented approximately parallel to one another along their length;

said manufactured hemp block comprises an amount of adhesive in the range of 5% by weight to 49% by weight and an amount of hemp stalk strands of greater than 50% by weight;

said manufactured hemp block has a generally uniform density in the range of 600 kg/m3 to 1200 kg/m3; and said manufactured hemp block can be used as a wood substitute in appearance and technical properties.

2. The manufactured hemp block in claim 1, wherein said manufactured hemp block has a dimensional stability coefficient of change that is at least 10% more stable than an original hemp stalk according to the dimensional stability coefficient of change.

3. The manufactured hemp block of claim 1, wherein said manufactured hemp block has a hardness greater than 5 kN according to the Janka Hardness scale.

4. The manufactured hemp block of claim 1, wherein at least one of said partially broken hemp strands are from replenishable indoor plant or agricultural outdoor crop grown and harvested in less than 1 year.

5. The manufactured hemp block of claim 1, wherein one or more of said partially broken hemp strands is from hemp stalk that has a density in the range of 200 kg/$m^3$ to 900 kg/$m^3$.

6. The manufactured hemp block of claim 1, wherein said hemp strands are from the stalk, petiole, nodes and internodes from at least one of Cannabis Sativa, Cannabis Indica and Cannabis Ruderalis.

7. The manufactured hemp block of claim 1, wherein said manufactured hemp block can be cut into a board, beam or panel and said board, beam or panel product can be used in a finished products such as flooring, furniture and other wood products.

8. The manufactured hemp block of claim 1 wherein said adhesive is an agricultural based adhesives suitable for the product of at least one of soy based adhesives, hemp based adhesive, a wheat based adhesive, and a flower based adhesive.

9. The manufactured hemp block of claim 1 wherein said adhesive is a fossil fuel based adhesive from at least one of urea formaldehyde, phenol formaldehyde, melamine urea formaldehyde, polyvinyl acetate, polyurethane, emulsion polymeric isocyanates, and melamine formaldehyde.

10. The manufactured hemp block of claim 1 wherein said adhesive includes both said agricultural based adhesive said fossil fuel based adhesive.

11. A process of manufacturing a manufactured hemp block comprising:

cutting a number of hemp strands containing both bast fiber and hurd to generally the same length wherein each of said hemp strands comprises a naturally-occurring, generally elongate internal structure extending generally along one axis of the strand; wherein said step of cutting includes at least partially laterally breaking said hemp strands;

orientating said number of hemp strands to be roughly parallel to one another along their length;

bonding said number of hemp strands together by adding an amount of adhesive such that said manufactured hemp block includes 5% by weight to 49% by weight of said adhesive and includes an amount of hemp strands of greater than 50% by weight;

permeating at least some of the broken hemp strands with said adhesive;

cold pressing said broken hemp strands and adhesive together;

creating said manufactured hemp block which has a generally uniform density in the range of 600 kg/m3 to 1200 kg/m3; and where said manufactured hemp block can be used as a wood substitute in appearance and technical properties.

* * * * *